Dec. 27, 1927.
E. M. SHANNON
1,653,737
CYLINDRICAL VALVE
Filed Jan. 8, 1925
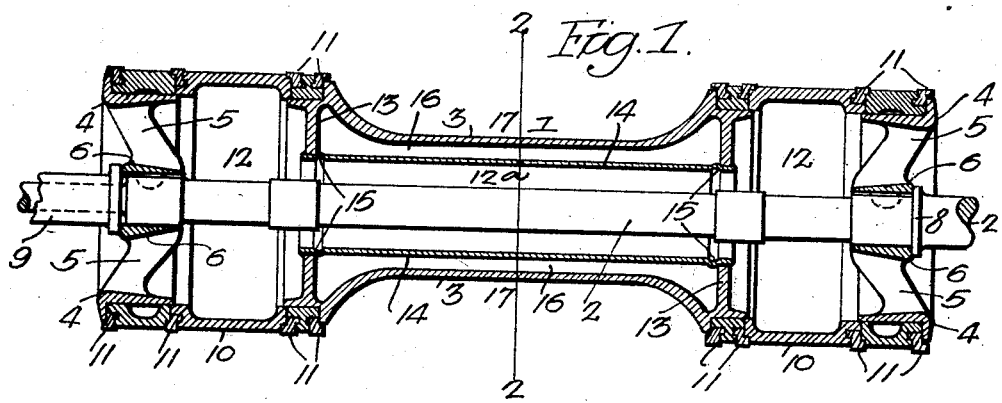
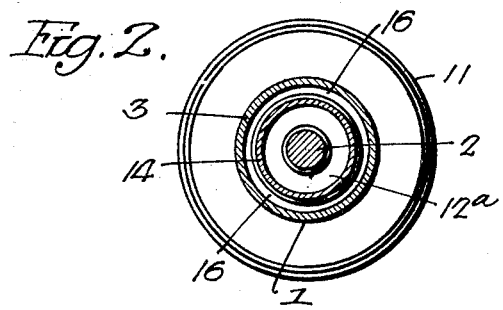
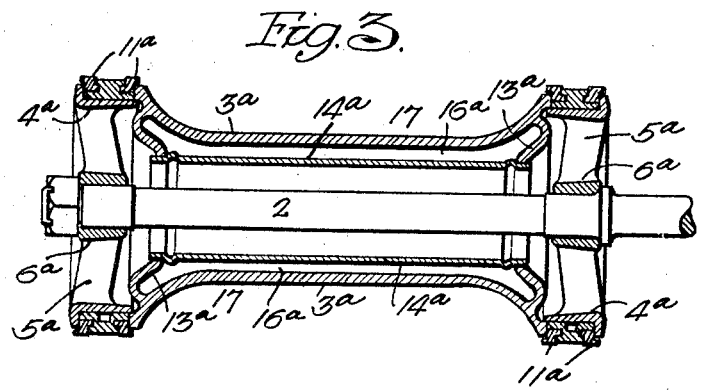
Inventor-
Ellwood M. Shannon.
by his Attorneys.—

Patented Dec. 27, 1927.

1,653,737

UNITED STATES PATENT OFFICE.

ELLWOOD M. SHANNON, OF BALA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

CYLINDRICAL VALVE.

Application filed January 8, 1925. Serial No. 1,301.

The object of my invention is to provide a cylindrical valve with a "dead" space between the live steam passage and the exhaust steam passage so that the exhaust steam, as it flows through the valve, will not reduce the temperature of the live steam that is passing from the valve to the cylinder.

The invention is especially adapted for use in locomotive engines, but it will be understood that it can be used in other types of steam engines without departing from the essential features of the invention.

In the accompanying drawings:

Fig. 1 is a longitudinal sectional view of a cylindrical valve illustrating my invention;

Fig. 2 is a sectional view on the line 2—2, Fig. 1; and

Fig. 3 is a longitudinal sectional view of another form of valve illustrating my invention.

Referring to the drawings, particularly Figs. 1 and 2, 1 is the valve, which is mounted on a valve stem 2 that extends entirely through the valve, as shown in said figures. The central portion 3 of the valve is reduced in diameter to form the exhaust passage that surrounds the valve. At each end of the valve are heads 4, which have spiders 5, in which are the hubs 6 that are mounted on the valve stem 2 and are secured in position by keys, or other fastenings. The valve stem has an integral flange 8 at one end. There is a washer and a sleeve 9 at the opposite end, which hold the valve in proper position on the stem 2.

The valve illustrated in Fig. 1 has a section 10 near each end, which is located between the enlarged portion of the central section and a head 4. 11 designate packing rings.

The type of valve shown in Fig. 1 is open throughout its length and live steam is free to travel through the passage 12 in the valve. Formed integral with the central section 3 of the valve are partitions 13, which have enlarged openings therein. A tubular section 14 of large diameter extends through the central portion of the valve and is secured to the partitions 13, in the present instance, by beading 15. The tubular sections form a connecting live steam passage 12ª, which surrounds the stem 2, and also forms, with the outer shell of the section 3, a dead air space 16. This dead air space separates the wall of the exhaust passage from the wall of the live steam passage so that the reduced temperature of the exhaust steam will not reduce the temperature of the live steam.

In Fig. 3 a construction is shown, in which the exhaust steam passes through the center of the valve, and the live steam enters the cylinders through the external passage 17, which is formed by the reduced diameter of the central section 3ª of the valve. The heads 4ª of the valve abut against the ends of the central section, as shown clearly in Fig. 3, and the usual packing rings 11ª are located as illustrated in the drawings.

Each head has an outer ring, a hub 6ª and a spider 5ª. The central section has a partition 13ª at each end, which is curved inwards, in the present instance. Extending from one partition to the other is the tube 14ª, which forms, with the wall of the central section 3ª, a dead air space 16ª that separates the live steam port from the internal exhaust steam passage.

It will be seen from the construction illustrated in Figs. 1 and 3 that the walls of the live steam passage are not in direct contact with the exhaust steam passage so that the live steam is not reduced in temperature as it passes through the valve to the cylinders.

I claim:

1. The combination of a cylindrical valve for steam engines, open at each end to form an exhaust passage and having an annular recess at the centre forming an outside steam passage, the valve having a transverse partition near each end thereof; and a tubular longitudinal partition located in the valve and secured to the two transverse partitions, said longitudinal partition forming a connecting exhaust steam passage and also forming with the outer shell and the transverse partitions a dead air space.

2. The combination in a cylindrical valve of a central section having a transverse partition at each end; end sections; a stem extending through the valve, said central section being depressed at the center to form an annular external live steam space; and a tube greater in diameter than the stem, said tube extending through the central section of the valve and secured thereto and forming an exhaust passage, the tube forming, with the outer wall and the end partitions of the central section, a dead air space that separates the live steam passage from the exhaust passage.

3. The combination in a cylindrical valve, of a central section; end sections; a stem extending through the said sections and secured to the end sections, the central section having a transverse partition at each end and reduced in diameter at the center, to form an annular steam passage, and a tube extending through the central section and secured to the partitions thereof and forming an exhaust steam passage, said tube forming, with the outer wall and transverse partitions of the central section, a dead air space that separates the live steam passage from the exhaust passage.

ELLWOOD M. SHANNON.